L. M. SHAW.
MECHANICAL CHANGE SPEED APPLIANCE.
APPLICATION FILED JUNE 26, 1918.

1,344,727.

Patented June 29, 1920.
3 SHEETS—SHEET 1.

Inventor
Levi M. Shaw

L. M. SHAW.
MECHANICAL CHANGE SPEED APPLIANCE.
APPLICATION FILED JUNE 26, 1918.

1,344,727.

Patented June 29, 1920.

Inventor
Levi M Shaw
By [signature] Atty

L. M. SHAW.
MECHANICAL CHANGE SPEED APPLIANCE.
APPLICATION FILED JUNE 26, 1918.
1,344,727.
Patented June 29, 1920.
3 SHEETS—SHEET 3.
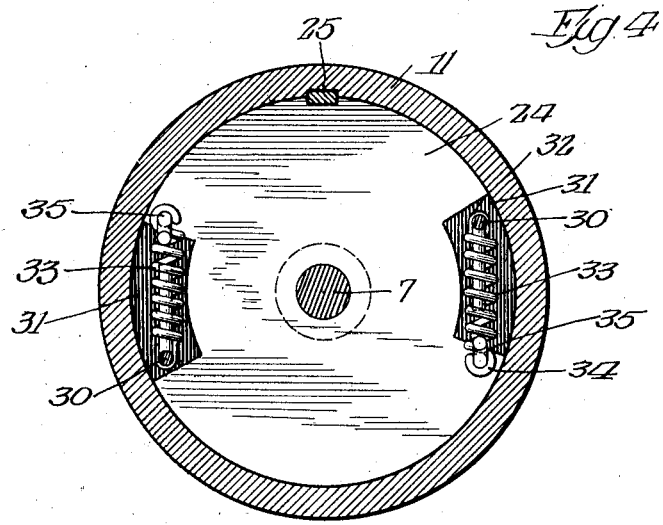
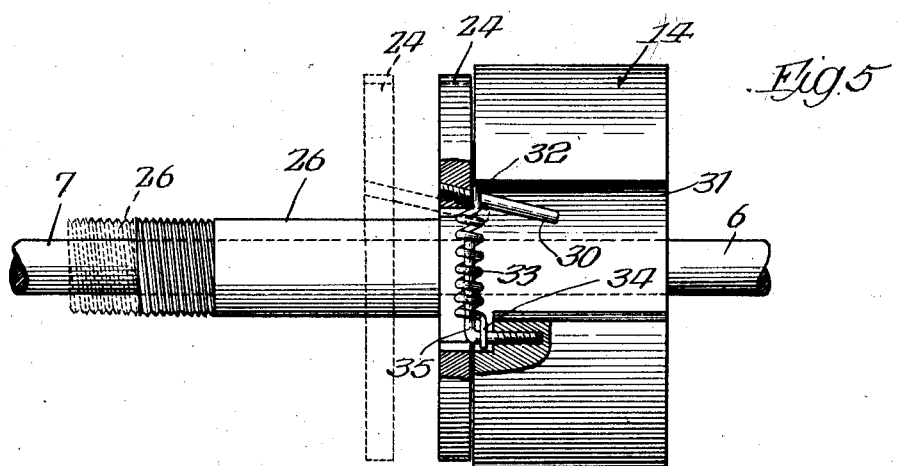
Inventor
Levi M. Shaw
By [signature] Atty.

UNITED STATES PATENT OFFICE.

LEVI M. SHAW, OF GLENCOE, ILLINOIS, ASSIGNOR TO HARRY C. JOHNSON, OF GLENCOE, ILLINOIS.

MECHANICAL CHANGE-SPEED APPLIANCE.

1,344,727.　　　　　　　Specification of Letters Patent.　　Patented June 29, 1920.

Application filed June 26, 1918. Serial No. 241,930.

*To all whom it may concern:*

Be it known that I, LEVI M. SHAW, a citizen of the United States, residing at Glencoe, in the county of Cook and State of Illinois, have invented certain new and useful Improvements in Mechanical Change-Speed Appliances, of which the following is a specification.

The present invention relates to an appliance for changing or varying the speed ratio between a drive shaft and a driven shaft.

One object of the invention is to provide a connection between said shafts to vary the speed ratio thereof, which connection shall consist entirely of mechanical parts.

A further object of the invention is to so arrange the device that the ratio of speed transmitted from the drive shaft to the driven shaft can be varied by the movement of shiftable mechanism under the control of the user.

A further object of the invention is to so arrange the parts that an automatic compensation for wear will take place.

Other objects of the invention are, to provide outer and inner eccentric members which are rotated by the drive shaft; to arrange these members concentric to one another and in spaced apart relation; to interpose a concentric ring in the space between the eccentric members, which ring normally is free to independently turn about its own axis between said members; to establish a driving connection between said ring and the driven shaft; and to provide means for exerting a variable braking pressure upon said ring, thereby varying the degree of independent turning movement allowed between the ring and the eccentric members and varying the amount of motion transmitted from said eccentric members through the ring to the driven shaft.

The invention further consists in the features of construction and combination of parts hereinafter described and claimed.

Figure 1:
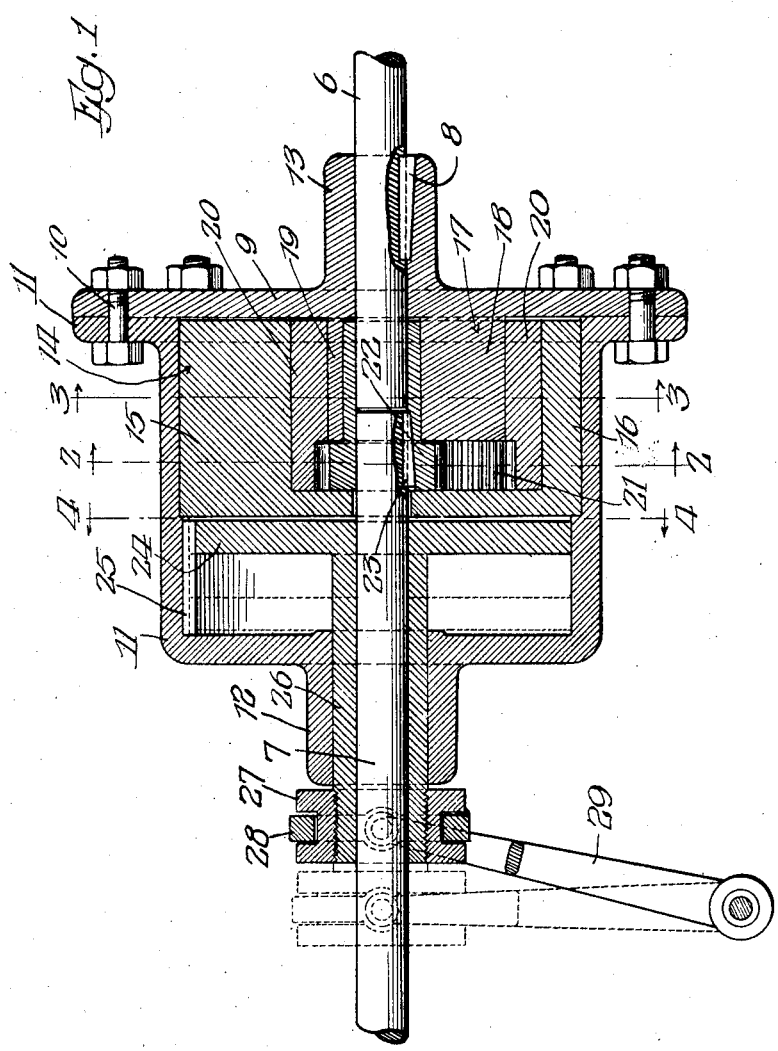
Figure 1 is a longitudinal section of the appliance of the present invention.
Figure 2:
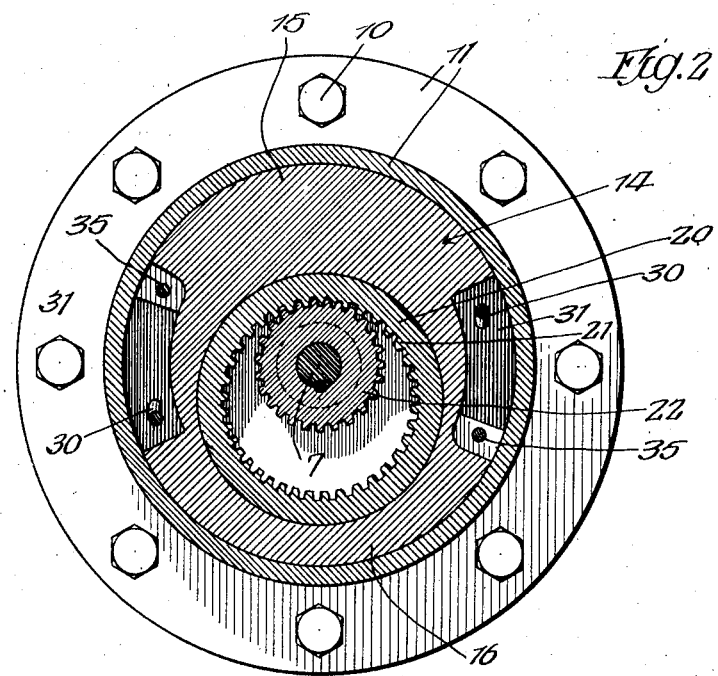
Fig. 2 is a cross section on line 2—2 of Fig. 1, looking in the direction of the arrows.

Fig. 4 is a section on line 4—4 of Fig. 1, looking in the direction of the arrows; and Fig. 5 is a view of the shiftable member for varying the pressure on the concentric ring shown in operative relation to the outer eccentric and partially broken away to show the tension connection between the shiftable member and said eccentric, and also showing said shiftable member in one position in full lines and in moved position in dotted lines.

Referring now to the drawings, the device is shown in conjunction with a drive shaft 6 and a driven shaft 7, the drive shaft being operated from any suitable source of power and the driven shaft being connected to any suitable form of mechanism which is to be driven. The drive shaft has connected thereto, by means of a key 8 or otherwise, a plate 9, which is secured by fastening members 10 to a chambered member 11, said plate 9 and chambered member 11 constituting a casing. The chambered member terminates in a neck 12 and the plate 9 in a neck 13, which latter is keyed to the drive shaft, as will be seen from the drawings, whereby all parts of the casing are rotated with said drive shaft.

Figure 3:
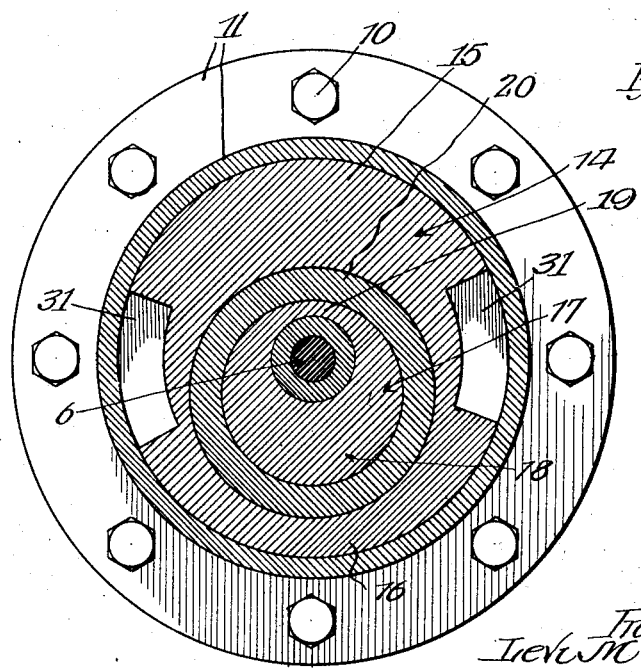
Fig. 3 is a cross section on line 3—3 of Fig. 1, looking in the direction of the arrows.

Mounted within the chambered member 11 is an outer eccentric member 14, which, as will be seen from Fig. 3, consists of a thick portion 15 graduating into a thin portion 16, and the member 14 lies eccentrically with respect to the drive shaft 6. Also arranged about the drive shaft is an inner eccentric 17, which, as will be seen from Fig. 1, is formed integral with the plate 9, and by reason of the connection of said plate to the drive shaft, revolves therewith. This eccentric portion 17 comprises a thick portion 18 graduating into a thin portion 19 (see Fig. 3), and the portions 17 and 18 are arranged in converse relation to the arrangement of the thick portion 15 and the thin portion 16 of the eccentric 14. These eccentrics are spaced apart from one another and interposed within the space between them is a concentric ring 20. This ring has no positive connection with either the eccentric 17 or 14, and under normal conditions, which will be hereinafter explained, it can revolve independently about its own axis between said eccentrics, although, of course, it moves bodily with them about their center of rotation. Therefore, it will normally have a double motion, namely, it will be moved bodily about the center of rotation of the eccentrics 14 and 17 conjointly with the rotation of said eccentrics, and will also have an independent rotative motion about its own center, turning in such motion between the adjoining peripheries of said eccentrics. When said ring is interposed between the eccentrics, it will be understood from Fig. 3 how both the outer and inner eccentrics are simultaneously turned.

The inner portion of the ring 20 is formed with an interior gear 21, the teeth of which mesh with the teeth of a pinion 22 on the driven shaft 7. The pinion is fixed to the driven shaft by means of a key 23. Located within the rear portion of the chambered member 11 is a head 24, which is keyed to the walls of said member by means of a spline 25. The head 24 is formed with a sleeve 26 loose upon the driven shaft 7, and this sleeve is joined to a grooved collar 27 with which connects the forked end 28 of a lever 29, said lever being under the control of the operator by means of any suitable connection.

The head 24 carries a plurality of diagonally disposed rods or pins 30, and in the construction shown these are two in number. Each of these pins extends into a recess 31 formed in the outer eccentric 14; and to each of these pins is connected one loop end 32 of a coil-spring 33, the other end 34 of which spring is connected to a stem 35 affixed to the eccentric 14.

Assume now that the parts are in the position shown by dotted lines in Fig. 5, under such conditions the spring will make a connection between the eccentric 14 and the head 24, so that these parts are turned in unison. The spring, however, will be in collapsed condition and will not be exerting any tension or pull upon the eccentric 14; and the eccentric is thus revolving freely and unimpeded with the drive shaft. The inner eccentric 17 is revolving in a similar manner and the two eccentrics are therefore revolving completely in unison. The ring 20 is being carried by said eccentrics bodily in a path of travel about the center of movement of said eccentrics, but owing to the fact that the two eccentrics are traveling completely in unison, the ring will have an independent turning movement between the peripheries of the eccentrics, and so turning, will ride idly over the periphery of the pinion 22 and will transmit no turning movement to the pinion. Under such conditions there will be no power transmitted from the drive to the driven shafts. The above situation will be present when the engine is idling.

Assume now that the lever 29 is actuated to move the sleeve 26 and position the head 24 as shown by full lines in Fig. 5, such movement of the head will cause the pin 30 to be inserted farther within the recess 31; and owing to the diagonal disposition of the pin, the farther it is inserted within the recess, the greater it will expand the spring 33. When the spring is thus expanded, it will place a tension upon the outer eccentric 14, this tension being in proportion to the amount of the expansion of the spring. The tension will tend to produce an accelerating action upon this eccentric and impart to it a pressure tending to abnormally advance it in the direction in which it is rotated by the action of the drive shaft. When this accelerating pressure is exerted, tending to increase the speed of movement of the eccentric 14, it will cause this eccentric to change position with respect to the inner eccentric 17 and impinge upon the ring 20 to wedge said ring between the inner and outer eccentrics, thus retarding the independent movement of the ring about its own axis and between the peripheries of the eccentrics. When held against such independent rotative movement, it exerts a driving action on the pinion 22 and thus transmits a movement to the driven shaft 7.

The strain placed on the ring by turning the pinion 22 will tend to turn the ring backward and break the wedging action exerted on it by the outer and inner eccentrics, and will tend to cause the ring to again independently revolve about its own axis between the eccentrics, but immediately when it starts to so revolve, the tension of the spring 33 again acts to throw the eccentric 14 into biting engagement with the ring and again wedge the ring between both the eccentrics, so that it is held against independent turning movement. The effect is that the tension of the spring 33 places a thrust upon the outer eccentric, which thrust causes said eccentric to exert a frictional braking pressure against the ring 20, interrupting or retarding the independent turning movement of the ring between the peripheries of the eccentrics and about its own axis. Such retarding action is in proportion to the degree of the braking action exerted by the eccentrics and hence in proportion to the tension under which the spring 33 is placed. Thus, by varying the tension of this spring, the thrust upon the outer eccentric can be varied and the braking or retarding action upon the ring 20 varied; and since the rotative movement imparted to the pinion 22 is in direct proportion to the amount of the braking action on the ring 20, it is obvious that any desired degree of movement can be transmitted from the drive shaft 6 to the driven shaft 7.

By placing the head 24 in the position shown by full lines in Fig. 5, the spring 33 is extended to its maximum amount, and under such conditions no slippage will be allowed between the ring and the eccentrics and a direct drive will thus be established between the drive and driven shafts. The spring pressure which is applied to the outer eccentric will tend to automatically readjust the part in case of wear.

Although the invention has been described with considerable particularity, it is not deemed to be limited other than may be by the terms of the appended claims.

In the foregoing description, repeated reference has been made to the outer eccentric when thrust forward placing a drag upon the inner ring to retard its independent turning movement. The retardation referred to is one which affects the independent turning movement of the ring between the eccentrics and should not be confused with the actual speed of rotation of the ring, since when the ring is locked between the eccentrics and its independent turning movement checked, it then travels in unison with the eccentrics and thus rotates in fact at a higher rate of speed than during its independent turning movement. The following example will illustrate the above point.

Assume the drive shaft and eccentrics to be traveling at the rate of 1,000 R. P. M.; assume that the inner ring when allowed to participate in its independent rotative movement has a speed of 250 R. P. M.; and assume that a thrust is placed on the outer eccentric, so that it arrests or retards the independent turning movement of the ring for one-half of the time: During the periods while the ring is allowed an independent turning movement, it would have its speed of 250 R. P. M.; during the time when it is locked between the eccentrics and its independent turning movement retarded or checked, it would have a speed of 1,000 R. P. M.; and the resultant average speed would be 625 R. P. M. There would then be effected a differential drive between the drive and driven shafts of a ratio of 1,000 R. P. M. for the drive shaft to 625 R. P. M. for the driven shaft.

I claim:

1. In a change speed device, the combination of a drive shaft, a driven shaft, outer and inner eccentric members rotated by the drive shaft, said outer member surrounding the inner member and spaced apart therefrom, an eccentric ring interposed between said members and having no positive connection therewith and normally free to independently turn between said members, a driving connection between the ring and driven shaft, and means for exerting variable pressure on one of said eccentric members to transmit a corresponding retarding pressure on to said ring and vary the degree of independent turning movement of said ring, thereby transmitting a corresponding speed from the drive to the driven shaft, substantially as described.

2. In a change speed device, the combination of a drive shaft, a driven shaft, eccentric means revoluble with the drive shaft, means carried by said revoluble means and having an independent revoluble motion with respect thereto and adapted for transmitting driving motion therefrom, a driving connection between said independent revoluble means and the driven shaft, and means for retarding the independent motion of said independently revoluble member in variable degrees to transmit a corresponding speed from the drive to the driven shaft, substantially as described.

3. In a change speed device, the combination of a drive shaft, a driven shaft, eccentric means revoluble with the drive shaft, means carried by said revoluble means and having an independent revoluble motion with respect thereto and adapted for transmitting driving motion therefrom, a driving connection between said independent revoluble means and the driven shaft, and means for exerting a braking action in variable degrees on said independently revoluble member to variably retard its independent motion and transmit a corresponding speed from the drive to the driven shaft, substantially as described.

4. In a change speed device, the combination of a drive shaft, a driven shaft, spaced eccentric members revoluble with the drive shaft, means carried by said revoluble members and having an independent revoluble motion with respect thereto and adapted for transmitting driving motion therefrom, a driving connection between said independent revoluble means and the driven shaft, and tension mechanism for causing a retardation of the independent motion of said independently revoluble member in variable degrees, thereby transmitting a corresponding speed from the drive shaft to the driven shaft, substantially as described.

5. In a change speed device, the combination of a drive shaft, a driven shaft, eccentric means revoluble with the drive shaft, means carried by said revoluble means and having an independent revoluble motion with respect thereto and adapted for transmitting driving motion therefrom, a driving connection between said independent revoluble means and the driven shaft, and means revoluble with the drive shaft for exerting variable retarding pressures on said independent revoluble member to variably retard the independent motion thereof and transmit a corresponding speed from the drive to the driven shaft, substantially as described.

6. In a change speed device, the combination of a drive shaft, a driven shaft, eccentric means revoluble with the drive shaft, means carried by said revoluble means and having an independent revoluble motion with respect thereto and adapted for transmitting driving motion therefrom, a driving connection between said independent revoluble means and the driven shaft, shiftable means carried by said drive shaft, and tension mechanism operated by said shiftable means, said tension mechanism when actuated causing a pressure in variable degrees to be exerted on said independently revoluble member to variably retard the independent motion thereof and transmit a corresponding speed from the drive to the driven shaft, substantially as described.

7. In a change speed device, the combination of a drive shaft, a driven shaft, outer and inner eccentric members rotated by the drive shaft, the outer member surrounding the inner member and spaced away therefrom, a concentric ring interposed between said members and having no positive connection therewith and normally free to independently turn between said members, a gear connection between the ring and driven shaft, and means for exerting a pressure in variable degrees on one of said eccentric members to transmit a variable retarding pressure on to said ring and vary the degree of independent turning movement of said ring, thus transmitting a corresponding speed from the drive to the driven shaft, substantially as described.

8. In a change speed device, the combination of a drive shaft, a driven shaft, outer and inner eccentric members rotated by the drive shaft, the outer member surrounding the inner member and spaced away therefrom, an eccentric ring interposed between said members and having no positive connection therewith and normally free to independently turn between said members, a driving connection between the ring and driven shaft, and means for exerting a tension pressure in variable degrees on one of said eccentrics, causing a corresponding degree of push on said eccentric to turn the same and wedge the ring between both of said eccentrics, whereby the independent turning movement of said ring is variably retarded and a corresponding speed transmitted from the drive to the driven shaft, substantially as described.

9. In a change speed device, the combination of a drive shaft, a driven shaft, outer and inner eccentric members rotated by the drive shaft, the outer member surrounding the inner member and spaced away therefrom, an eccentric ring interposed between said eccentric members and having no positive connection therewith and normally free to independently turn between said members, a driving connection between the ring and driven shaft, means for exerting a tension in variable degrees on one of said eccentrics to transmit a corresponding retarding pressure on to said ring, whereby a corresponding speed is transmitted from the drive to the driven shaft, and shiftable means carried by said drive shaft for varying the degree of said tension, substantially as described.

10. In a change speed device, the combination of a drive shaft, a driven shaft, a pinion on the driven shaft, a ring, means for bodily carrying said ring with the drive shaft and in an eccentric path of travel about said shaft, said ring being mounted in said carrying means to have an independent turning movement with respect thereto, means for variably retarding said independent turning movement, and an interior gear on said ring meshing with said pinion and adapted when said ring is retarded to transmit a turning movement to the pinion in correspondence to the turning movement of the ring, substantially as described.

11. In a change speed device, the combination of a drive shaft, a driven shaft, a ring, coöperating means on the ring and driven shaft for transmitting movement from the ring to the driven shaft, means operated by the drive shaft for carrying the ring in a circular path of travel about the driven shaft, said ring being mounted in said carrying means to have an independent turning movement with respect thereto, means for adjustably moving said carrying means to variably retard said independent turning movement of the ring, and said ring when so retarded transmitting a corresponding variable speed to the driven shaft, substantially as described.

LEVI M. SHAW.